(No Model.)

L. O. HARRIS.
SAW SWAGING DEVICE.

No. 394,570. Patented Dec. 18, 1888.

Attest
J. H. Giddings
F. A. Diggins

Inventor.
Levi O. Harris,
Per A. G. Fuller,
Atty.

UNITED STATES PATENT OFFICE.

LEVI O. HARRIS, OF CADILLAC, MICHIGAN.

SAW-SWAGING DEVICE.

SPECIFICATION forming part of Letters Patent No. 394,570, dated December 18, 1888.

Application filed September 6, 1888. Serial No. 284,720. (No model.)

*To all whom it may concern:*

Be it known that I, LEVI O. HARRIS, a citizen of the United States, residing at the city of Cadillac, county of Wexford, and State of Michigan, have invented certain new and useful Improvements in Saw-Swages; and that all who are skilled in the business to which it appertains may be able to manufacture and use the same I declare the following specification to be a full, clear, and exact description of my improved swage, reference being had to the accompanying drawings, and to the letters and figures marked thereon, as said drawings form a part of said specification.

My invention relates to improvements in devices for swaging the teeth of saws, whereby the saw remains stationary and the swage travels along the saw automatically from tooth to tooth as the swaging proceeds, and to improvements in the construction of die-blocks and the arrangement therein of a reciprocating die and anvil and clamping mechanism for holding the die-block firmly to the saw while a tooth is being swaged and moving the swage forward when the clamp is released.

My invention consists in the construction, relation, and operation of the various parts hereinafter described; and its object is to provide an easier, more rapid, and effectual method of swaging saws than has been heretofore in use, without the trouble necessarily consequent upon either moving the saw or the swaging-machine by an independent action not connected with the operation of swaging each time a tooth is swaged.

In the accompanying drawings similar letters of reference refer to similar parts in all figures.

Figure 1:
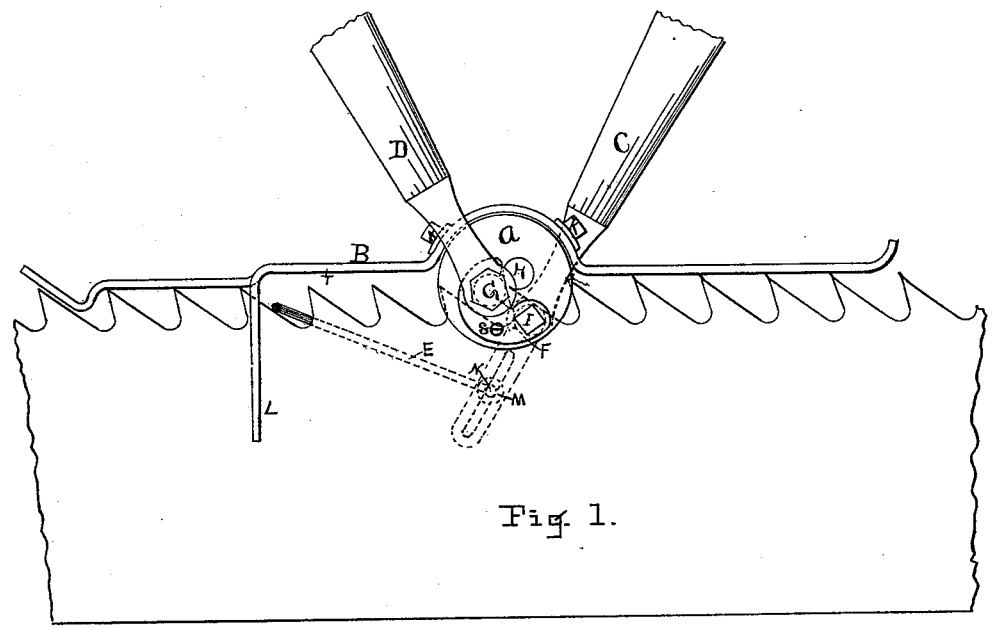
Figure 2:
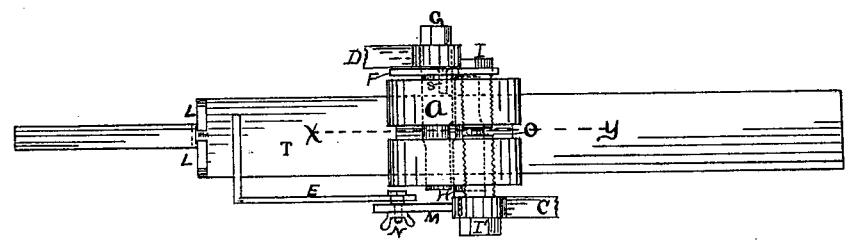
Figure 3:
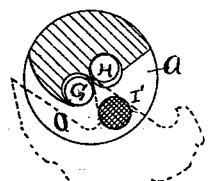
Figure 4:
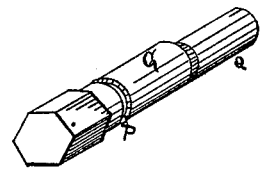

Figure 1 is a general side view of my swage in position upon a saw for use, the dotted lines showing the interior and parts upon the opposite side. Fig. 2 is a view of the complete swage, looked at from the bottom, the dotted lines indicating the position of the parts passing through it. Fig. 3 is a side view of the die-block on a vertical cutting, showing the arrangement of the anvil-die and clamp with their respective positions when operating on a saw-tooth. Fig. 4 is a perspective view of the die.

In the various figures, A is a die or swage block of any convenient form, but preferably circular, as shown. Vertically through the lower portion of this block is a slot, O, adapted to receive the saw-tooth, as shown in Fig. 3.

B is a guide which is adjustably bolted to A by the bolts K K. B, as shown, has on either side the arms or projections L L, which, with the slot O, keep the swage in the plane of the saw. B has also that portion T between the guide-arms L L and the block A sufficiently raised above the plane of its other portions to allow the free passage of the drag-bar E between it and the points of the saw-teeth.

C is a lever-arm to a grip-bolt, J', which is provided with a right or left screw-thread on its body. J' passes through the portion of A on one side of the slot O.

J is a grip-bolt, exactly corresponding to J' and exactly opposite it in the opposite portion of O, but is stationary, except when turned for adjustment. The lever C also extends in a slotted portion, M, below J'. To N is attached, by any convenient or flexible joint, N, a drag-bar, E, which is so bent at its other end as to cross the plane of the slot O and catch the tooth of the saw, as shown in Fig. 1.

G is a cylindrical die having an eccentric face and one end of smaller diameter than the other. It is journaled in the block A, with the eccentric face in the slot O and adapted to be revolved by the lever-arm D. H, a cylindrical anvil, corresponds in all respects in form to G, but is fixed stationary in A, and is only revolved for the purpose of adjustment. The die G and anvil H are so placed in the block A that the enlarged portion of each is opposite the smaller portion of the other and the eccentric faces opposite each other. G is held in position laterally by any suitable means, as by the plate F, fastened by the screws to the block A and passing over and holding in adjustment J and engaging the groove P of the die G.

I use my swage in the following manner, viz: It is placed on the saw, as shown in Fig. 1, the saw passing through the slot O and the arms L L, the tooth to be swaged fitting in between the die G and the anvil H, as shown in Fig. 3. The lever C is first moved toward the right until the grip-bolts J and J' hold the saw firmly. In doing this the drag-arm E, being rightly adjusted for the size of the tooth, will be pushed forward by M, the extended portion of C, so that it will drop over the next tooth ahead. The tooth, then between G and H, is swaged by moving the lever D toward the left, thereby partially revolving the die G, so that the eccentric face acts upon the tooth, pressing it against the eccentric portion of the anvil H, thereby swaging the tooth above and below. The tooth being sufficiently swaged, the lever D is carried back to its former position, and the lever C, being rotated back, loosens the grip-bolts J and J' and draws, by means of the drag-bar E, the swage one tooth farther forward, when the operation described is repeated.

Having thus described the construction and use of my swage so that any one skilled in the manufacture and use of such devices may be able to make and use it, what I claim as novel, and desire to secure by Letters Patent, is—

1. A saw-swage consisting of the swage-block A, a guide-bar, B, fastened thereto by bolts K K and provided with guide-arms L L, said B having a portion of its length, T, raised above the plane of the other portions to allow the passage of the drag-bar E between it and the point of the saw-tooth, the grip-lever C, extending in the portion M, the drag-bar E, the eccentric-faced die G, and anvil H, and the lever D, substantially as and for the purpose above specified.

2. In a saw-swage, the combination of the guide-bar B, having the arms L L and the raised portion T, adjustably attached to a swage-block, A, provided with an eccentric-faced die, G, and anvil H, and grip-bolts J and J', with a lever, C, having an extension, M, and a drag-bar, E, attached by a suitable joint to said M, substantially as and for the purposes above set forth.

3. In a saw-swage, the combination of a drag-bar, E, with a grip-bolt, J', by means of a lever, C, having an extended portion, into which said E is attached, whereby the action of said J' and E are made coincident and mutually dependent, substantially as and for the purposes above specified.

LEVI O. HARRIS.

In presence of—
  J. W. GIDDINGS,
  A. G. FULLER.